INVENTOR
George H. Dowty
BY
Orland M Christensen
ATTORNEY

Feb. 6, 1968 G. H. DOWTY 3,367,105
HYDRAULIC APPARATUS

Filed June 3, 1965 3 Sheets-Sheet 3

INVENTOR
George H. Dowty
BY
Orland M.
Christensen
ATTORNEY

# United States Patent Office 3,367,105
Patented Feb. 6, 1968

3,367,105
HYDRAULIC APPARATUS
George H. Dowty, Cheltenham, England, assignor to Dowty Technical Developments Limited, Cheltenham, England, a British company
Filed June 3, 1965, Ser. No. 461,207
Claims priority, application Great Britain, June 4, 1964, 23,126/64
4 Claims. (Cl. 60—19)

ABSTRACT OF THE DISCLOSURE

A power transmission unit is disclosed in which there is a hydrostatic transmission comprising a tilting head type hydraulic pump, a drive shaft for the pump, the tilting head of the pump being tiltable relative to the drive shaft about an axis extending transversely to the drive shaft axis, a hydraulic motor, and a motor power output shaft. A casing encloses the hydrostatic transmission and forms a reservoir for the working liquid of the transmission, the motor power output shaft extending through a wall of the casing. In addition, a main shaft extends through the casing substantially parallel to the pump drive shaft, one end of the main shaft being external of the casing to form a power input shaft and the other end of the main shaft being external of the casing to form a further power output shaft. Power is transmitted from the main shaft to the pump drive shaft by means of gears or the like. To produce a highly compact unit, the main shaft is arranged within the casing close to the volume swept out by the tilting head of the pump during its angular tilting movement, a portion of the tilting head of the pump remote from the tilt axis being closest to the main shaft at an angular position of the tilting head which is between its two extreme angular positions.

---

This invention relates to a power transmission. The transmission employs a hydrostatic transmission comprising a tilting head type hydraulic pump, a drive shaft for the pump, the tilting head of the pump being tiltable relative to the drive shaft about an axis extending transversely to the drive shaft axis, a hydraulic motor, and a motor power output shaft. The hydrostatic transmission is enclosed by a casing forming a reservoir for the working liquid of the transmission, and the motor power output shaft extends through a wall of the casing. In addition, a main shaft extends through the casing substantially parallel to the pump drive shaft, one end of the main shaft being external of the casing to form a power input shaft and the other end of the main shaft being external of the casing to form a further power output shaft. Power is transmitted from the main shaft to the pump drive shaft by means of gears or the like. A highly compact unit is produced by arranging the main shaft within the casing close to the volume swept out by the tilting head of the pump during its angular tilting movement, a portion of the tilting head of the pump remote from the tilt axis being closest to the main shaft at an angular position of the tilting head which is between its two extreme angular positions.

The gears are preferably enclosed in the casing.

The motor is preferably a joint tilting head motor which comprises a plurality of tilting heads, each containing cylinders having pistons which are reciprocable therein, the stroke of the pistons being variable by variation of the tilt angle of the head and the heads being securely fixed together for joint tilting movement about one tilt axis. Each tilting head is associated with a motor shaft and the plurality of motor shafts are connected together with gearing. One of the motor shafts may be extended to form the motor power output shaft or, alternatively, an independent shaft connected by gears to the plurality of shafts of the motor may form the motor power output shaft.

The joint tilting head motor is preferably arranged by the side of the main shaft and its head is preferably connected by a pivoted link to the head of the pump whereby the pump and the motor heads are adjustable simultaneously.

Within the casing an auxiliary pump such for example as a gear pump may be mounted on the main shaft to be driven thereby, the delivery of this auxiliary pump being used either for priming the hydrostatic transmission or alternatively for supply services other than the transmission.

Figure 1:
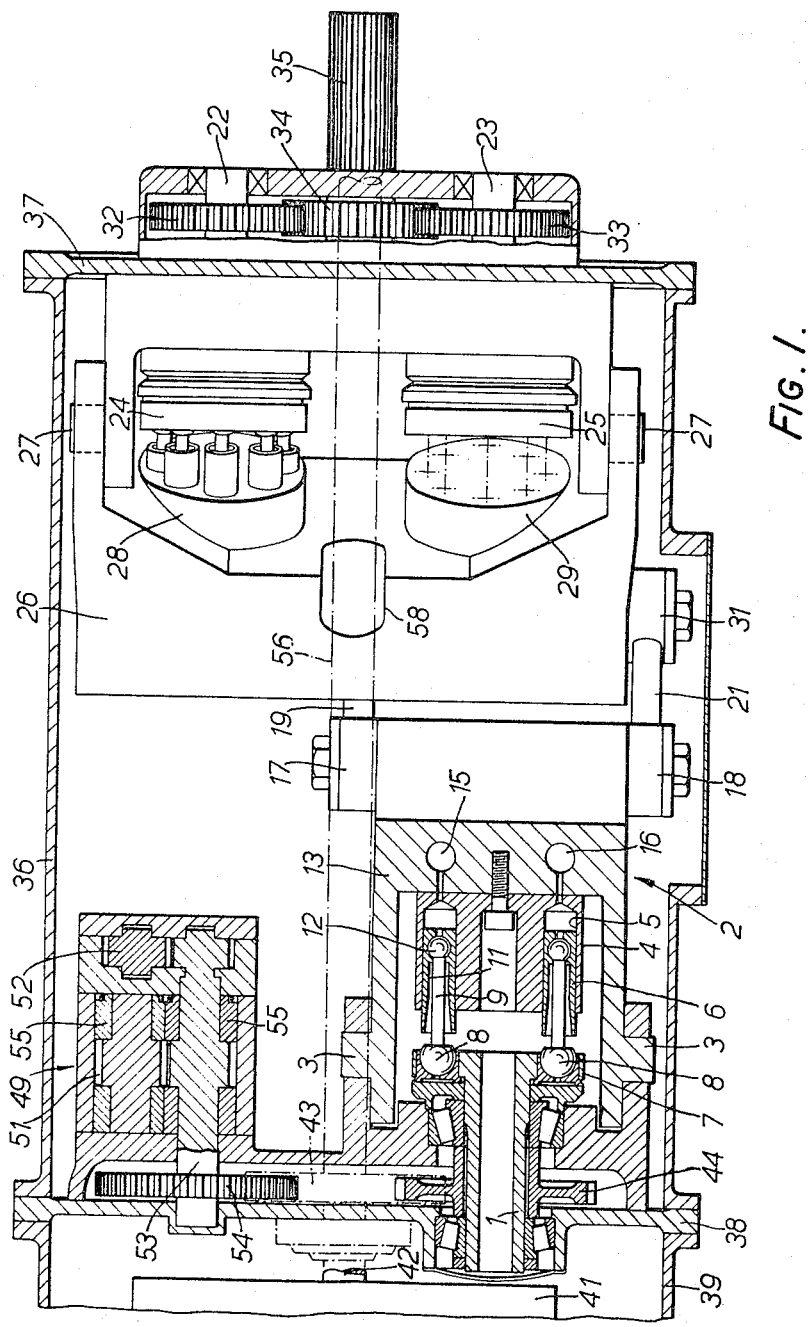
Figure 2:
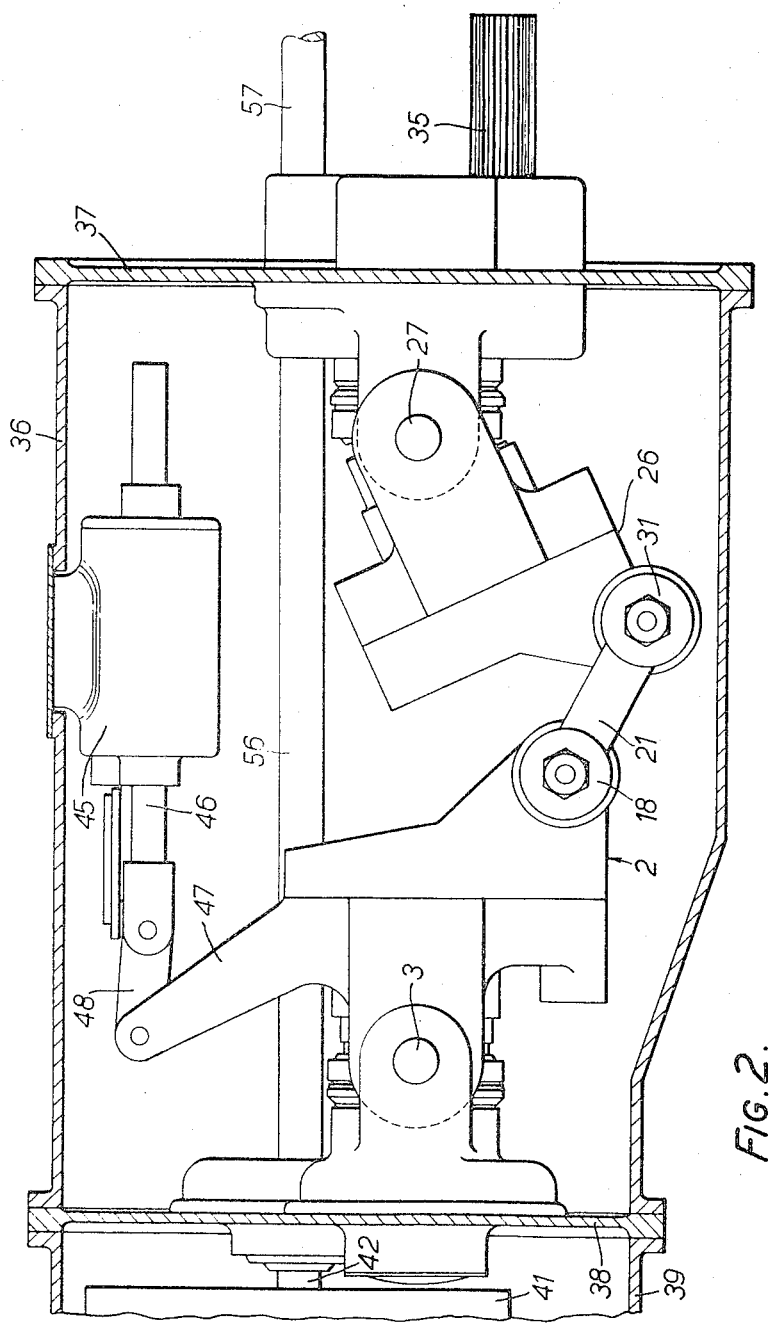
Figure 3:
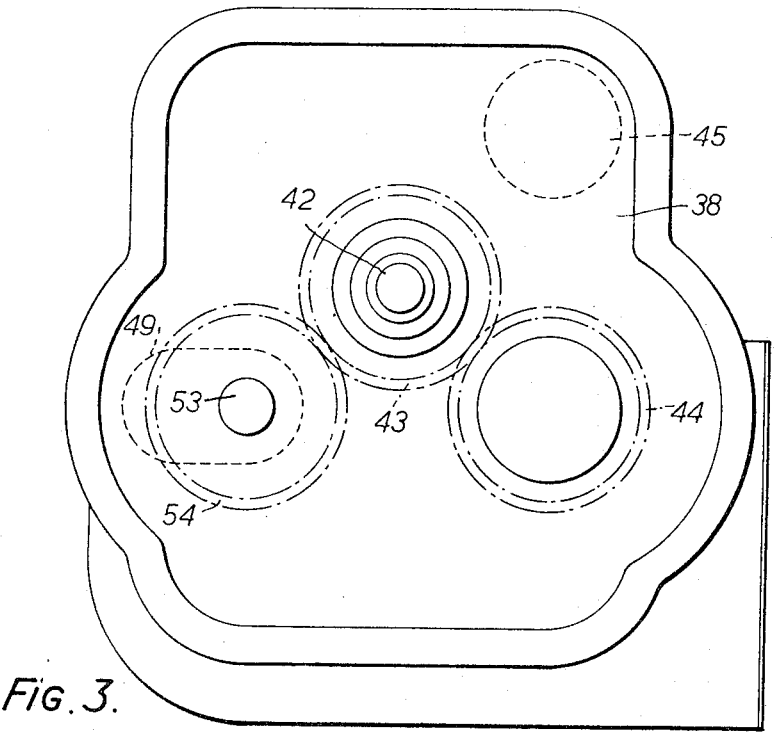
Figure 4:
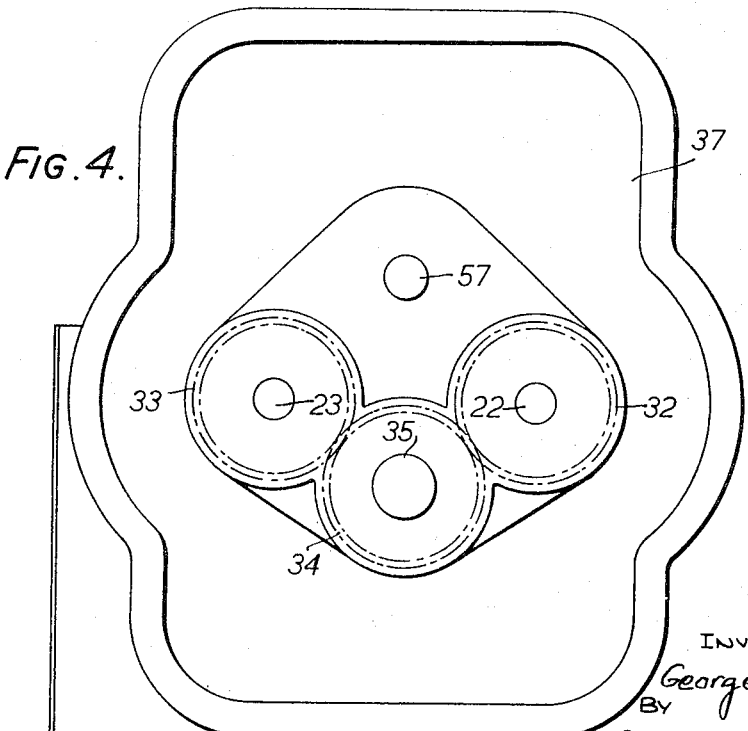

How the invention can be carried into effect is hereinafter particularly described with reference to the accompanying drawings in which, FIGURE 1 is a plan partly in section of a transmission in accordance with the invention, FIGURE 2 is an elevation partly in section of the transmission of FIGURE 1, and FIGURES 3 and 4 are elevations of the two ends of the transmission of FIGURES 1 and 2.

In the drawings the transmission pump comprises a pump shaft 1 and a tilting head 2 mounted in trunnions 3 for tilting movement about an axis transverse to the pump shaft axis. Located within the tilting head 2 is a rotary cylinder barrel 4 having cylinders 5 extending parallel to its rotation axis within which pistons 6 are reciprocably mounted. A drive flange 7 driven by the pump shaft 1 carries a number of ball joints 8 from which connecting rods 9 extend to the pistons in the cylinders. The connecting rods 9 extend through deep bores 11 in the pistons to terminate at ball joints 12 adjacent to the inner ends of the pistons. Rotation of the pump shaft 1 will rotate the drive flange 7 causing the connecting rods 9 to engage the bores 11 of the pistons to rotate the cylinder barrel. During rotation of the drive flange and the cylinder barrel the pistons will reciprocate within their cylinders if the cylinder barrel is inclined to the rotation axis of the drive flange. The cylinder barrel 4 rotates on a valve plate 13 carried by the tilting head for co-operation with a pair of ports 15 and 16 therein. The ports 15 and 16 co-operate with cylinder ports during rotation of the cylinder barrel. The ports 15 and 16 are respectively connected through swivel joints 17 and 18 to a pair of hydraulic links 19 and 21.

The transmission motor is a joint tilting head motor which includes a pair of motor shafts 22 and 23 connected to drive flanges 24 and 25 and a single tilting head 26 mounted on trunnions 27. A pair of cylinder barrels 28 and 29 are rotatably mounted within the head 26 for co-operation with the two drive flanges 24 and 25. Each of the drive flange and cylinder barrel combinations 24, 28 and 25, 29 are interconnected by pistons and connecting rods in the manner shown for the drive flange 7 and the cylinder barrel 4 of the pump. The head 26 includes a pair of valve surfaces co-operating one with each cylinder barrel 28 and 29, each valve surface including a pair of ports. These pairs of ports are connected in parallel to a pair of swivel joints 31 to which the hydraulic links 19 and 21 are individually connected. The motor shaft 22 carries a gear wheel 32 and the motor shaft 23 carries a gear wheel 33. Both of these gear wheels 32 and 33 mesh with an output gear wheel 34 which drives the shaft 35 forming the motor power output shaft.

The whole transmission is arranged within a casing 36 which also conveniently forms a reservoir for the working liquid of the transmission. The motor is secured to one end plate 37 of the casing 36, this end plate being detachably secured by bolts, not shown. The transmission pump is supported by another end plate 38, also secured in position by bolts, not shown. The casing 36 is adapted to fit on the flywheel casing 39 of an internal combustion engine of which only a part of the flywheel 41 is shown in the drawing. The engine crank shaft 42 extends from the flywheel into the end plate 38 where it rotates a gear 43 which meshes with a gear 44 mounted on the pump shaft 1. Rotational drive is thus transmitted from the engine to the pump shaft. The shaft 42 forms the power input shaft of the transmission.

The hydraulic links 19 and 21 are formed by tubes which interconnect the pump and the motor for flow of liquid between them and also mechanically interconnect the pump and the motor heads so that they must move together for displacement adjustment. In order to adjust the displacement a servo motor 45 is mounted on the casing 36. The servo motor 45 is a piston and cylinder unit from which a piston rod 46 extends. A lever 47 extends from the pump tilting head and is connected through the medium of a pivoted link 48 with the end of the piston rod 46. The links 19 and 21 are so arranged that when the pump head 2 is in its zero displacement position, i.e., when the axis of the cylinder barrel 4 is coaxial with the drive shaft, the axes of the two pairs of swivel joints 17, 18 and 31 lie in one plane with the pump trunnion axis and define the maximum angular setting of the motor head about its trunnion axis from the motor zero displacement position. This position of the links will be referred to as the dead centre position. Movement of the pump head 2 in either direction from the dead centre position will reduce the angular displacement of the motor head 26 as described in our co-pending application No. 392,880, filed Aug. 28, 1964, now Patent No. 3,241,319, issued Mar. 22, 1966.

At one side of the pump head at a position where it is intersected by the axis of trunnions 3, an auxiliary pump unit 49 is located. A common shaft 53 extends from two gear pumps 51 and 52 and carries a gear 54 which meshes with the gear 43 driven by the engine. The gear pump 51 is a comparatively large gear pump provided with pressure loaded bushes 55 which co-operate in known manner with the pump gears to enable the pump to deliver a high output pressure. The gear pump 52 is a conventional gear pump without pressure loaded bushes intended to supply a small flow rate of liquid at low pressure to maintain the hydrostatic transmission primed with liquid at low pressure.

Within the casing 36 the shaft 42 extends as a main shaft 56 completely through the casing and passes through a suitable bearing in the end plate 37 to terminate externally of the casing as the further power output shaft 57. It will be noted that the motor power output shaft is arranged by virtue of the gears 32, 33 and 34 to lie below the level of the motor shafts 22 and 23 and that the main shaft 56 extends through the end plate 37 at a position vertically above the motor power output shaft 35.

The main shaft 56 is arranged within the casing 36 close to the volume swept out by the tilting head 2 of the pump during its angular tilting movements about the trunnions 3 so that a portion of the tilting head, for example a part of the valve plate 13, which is remote from the tilt axis attains its closest position to the main shaft at an angular position of the tilting head which is between its two extreme angular positions. Adjusting movement of the motor head 26 following movement of the pump head 2 will move the motor head 26 towards the main shaft 56 from the position shown in the drawing. A recess 58 is formed in the motor head 26 to permit small movement of the motor head 26 without making contact with the main shaft 56. The total movement of the motor head 26 is quite small compared with the total movement of the pump head 2 because of the fact that movement of the pump head in either direction from the dead centre position will always cause the motor head to move in the same direction to reduce motor displacement. In practice the range of movement of the pump head is about 25° on either side of the dead centre position. During the whole of this movement the motor head moves from the maximum displacement position shown over a range of about 17° towards the motor zero displacement position. Within the range of movement permitted for the pump the motor will never reach zero displacement. Tilting movement of the pump head 2 will vary the speed ratio of the hydrostatic transmission and will thus vary the speed ratio between the input shaft 42 and the second output shaft 35. The speed of the input shaft 42 will always be equal to the speed of the further power output shaft 57 since they form part of the same shaft. The end plates 37 and 38 are provided with seals at the positions where shafts extend through them so that the casing 36 may form a reservoir for the working liquid of the transmission.

The illustrated transmission is particularly adapted for use on an agricultural tractor to supply power from the tractor engine both for propulsion of the tractor and for a power take off connection on the tractor. When mounted in a tractor the input shaft 42 is driven by the tractor engine and the further power output shaft 57 extends directly or through the medium of a gear train to the tractor power take off connection. The motor power output shaft 35 is connected through a suitable gear train to the ground engaging wheels of the tractor for tractor propulsion. For this arrangement the spacing between the two output shafts in the vertical direction is such that the motor power output shaft 35 may extend to the conventional differential gearing driving the ground engaging wheels of the tractor whilst the further output shaft 57 may extend over the top of the differential gearing to the power take off connection.

I claim as my invention:
1. In a power transmission unit
  (a) a hydrostatic transmission comprising
    (i) a tilting-head-type hydraulic pump,
    (ii) a drive-shaft for the pump, the tilting head of the pump being tiltable relative to the drive-shaft about an axis extending transversely to the drive shaft axis,
    (iii) a hydraulic motor, and
    (iv) a motor power-output shaft,
  (b) a casing enclosing the hydrostatic transmission and forming a reservoir for the working liquid of the transmission, the motor power-output shaft extending through a wall of the casing,
  (c) a main shaft extending through the casing substantially parallel to the pump drive-shaft, one end of the main shaft being external of the casing to form a power-input shaft and the other end of the main shaft being external of the casing to form a further power-output shaft, and
  (d) gears or the like arranged to transmit power from the main shaft to the pump drive-shaft,
  (e) the main shaft being arranged within the casing close to the volume swept out by the tilting-head of the pump during its angular tilting movement, a portion of the tilting-head of the pump remote from the tilt axis being closest to the main shaft at an angular position of the tilting-head which is between its two extreme angular positions.

2. A power transmission as claimed in claim 1 in which the gears are enclosed within the casing.

3. A power transmission as claimed in claim 1 wherein the motor is a joint tilting head motor comprising a plurality of motor shafts connected together with gearing, a tilting head for each motor shaft, each head having pistons which are reciprocated in cylinders by rotation of the motor shaft with a stroke variable by variation of the tilt angle of the head, the heads being fixedly secured together for joint tilting movement about one tilt axis.

4. A power transmission as claimed in claim 3 in which the motor power output shaft is driven by gears from the motor shafts.

References Cited

UNITED STATES PATENTS

| | | | |
|---|---|---|---|
| 3,036,434 | 5/1962 | Mark | 60—53 |
| 3,131,580 | 5/1964 | Forster | 74—687 X |
| 3,142,963 | 8/1964 | Thoma | 60—53 |
| 3,213,620 | 10/1965 | Swift et al. | 60—53 |

EDGAR W. GEOGHEGAN, *Primary Examiner.*